United States Patent [19]
Goodman et al.

[11] Patent Number: 5,591,298
[45] Date of Patent: Jan. 7, 1997

[54] MACHINE FOR ULTRASONIC BONDING

[75] Inventors: Steven L. Goodman; Robert E. Vogt, both of Neenah, Wis.

[73] Assignee: Kimberly-Clark Corporation, Neenah, Wis.

[21] Appl. No.: 990,824

[22] Filed: Dec. 11, 1992

Related U.S. Application Data

[63] Continuation of Ser. No. 679,713, Apr. 3, 1991, abandoned, which is a continuation of Ser. No. 382,448, Jul. 18, 1989, abandoned, which is a continuation of Ser. No. 145,781, Jan. 19, 1988, abandoned.

[51] Int. Cl.$^6$ ..................................................... B32B 31/16
[52] U.S. Cl. .................. 156/580.1; 156/73.1; 425/174.2
[58] Field of Search .............................. 156/73.1, 73.2, 156/73.4, 580.1, 580.2, 164, 166, 181, 285, 290; 425/174.2; 264/23; 226/95

[56] References Cited

U.S. PATENT DOCUMENTS

| | | | |
|---|---|---|---|
| 3,292,503 | 12/1966 | Grobman et al. | 93/36 |
| 3,331,728 | 7/1967 | Lane | 161/112 |
| 3,575,752 | 4/1971 | Carpenter | 156/181 X |
| 3,640,786 | 2/1972 | Carpenter | 156/73.2 |
| 3,853,662 | 12/1974 | Yazawa et al. | 156/285 X |
| 3,966,519 | 6/1976 | Mitchell et al. | 156/73.1 |
| 4,022,366 | 5/1977 | Rooney | 226/95 X |
| 4,081,301 | 3/1978 | Buell | 156/285 X |
| 4,194,947 | 3/1980 | Huostila et al. | 162/207 |
| 4,293,367 | 10/1981 | Klasek et al. | 156/494 |
| 4,382,758 | 5/1983 | Nopper et al. | 425/82.1 |
| 4,404,052 | 9/1983 | Persson et al. | 156/73.1 |
| 4,419,160 | 12/1983 | Wang et al. | 156/73.2 |
| 4,578,133 | 3/1986 | Oshefsky et al. | 156/164 |
| 4,713,132 | 12/1987 | Abel et al. | 156/73.1 |
| 4,747,895 | 5/1988 | Wallerstein et al. | 156/73.3 |
| 4,909,885 | 3/1990 | Swenson | 156/285 X |

FOREIGN PATENT DOCUMENTS 1018971  2/1966  United Kingdom.

*Primary Examiner*—James Sells
*Attorney, Agent, or Firm*—Jeffrey B. Curtin

[57] ABSTRACT

An apparatus (10) of the type for laminating two elastomeric fibrous web materials (14,16) together by ultrasonic bonding includes a continuously moving web transport support (12) for transporting at least two overlaid webs (14,16) through the apparatus (10). An ultrasonic horn (18) transmits ultrasonic energy to bond the webs (14,16) together into a laminate. An anvil underlies the ultrasonic horn (18). A vacuum mechanism (24) draws the webs (14,16) against the web transport support (12) for perfecting bonding and to prevent rippling and tearing of the webs (14,16) against the horn (18) and the web transport support (12) during the ultrasonic bonding.

5 Claims, 3 Drawing Sheets

MACHINE FOR ULTRASONIC BONDING

This is a continuation of application Ser. No. 07/679,713 filed on Apr. 3, 1991, abandoned, which is a continuation of Ser. No. 07/382,448 filed on Jul. 18, 1989, now abandoned, which is a continuation of Ser. No. 07/145,781 filed Jan. 19, 1988, now abandoned.

TECHNICAL FIELD

The present invention relates to a method and apparatus of the type for laminating two elastomeric fibrous web materials together by ultrasonic bonding. More specifically, the present invention relates to a novel means of supporting, handling and ultrasonically bonding a stretchable nonwoven fabric.

BACKGROUND ART

Stationary ultrasonic horns and anvils are commonly used for bonding a member to a moving web of an inelastic material. Problems arise when the raised dot pattern of the anvil is brought into contact with a moving web of elastomeric material. The web tends to ripple and become torn when passing over the raised dot pattern of the anvil during the bonding process. This problem cannot be remedied by using a smooth anvil having no dot pattern, even if a vacuum is associated with the anvil, because the raised dot patterns are required for bonding. Thermal bonding is inadequate because it does not sufficently penetrate the laminar structure of some elastomeric nonwoven fibrous webs. Thermal bonding tends to burn the surfaces of the laminar facing layers.

Vacuum mechanisms have been used in the prior art to hold down various elastic and inelastic materials. The U.S. Pat. Nos. 4,081,301 to Buell, issued Mar. 28, 1987; 4,022,366 to Rooney, issued May 10, 1977; and 3,853,662 to Yazawa et al, issued Dec. 10, 1974 each disclose a vacuum mechanism for holding down a material to a belt. The Buell patent discloses a method and apparatus for continuously attaching discrete, stretched elastic strands to predetermined isolated portions of disposable absorbent products. The vacuum hold down belt supports and carries a continuous web of disposable diapers. A suction box is attached to the underside of the belt. Vacuum in the box holds the web over the perforated belt and thereby provide sufficient resistance to slippage.

The Rooney patent discloses a belt made of an air pervious material, preferably a woven fabric.

The Yazawa et al patent discloses a process for laminating uniaxially stretched layers of film as warps or wefts utilizing a vacuum mechanism for sucking the layer of material onto a belt by negative pressure exerted from below the belt.

None of the aforementioned patents address the problem of continuously ultrasonically bonding two web materials into a laminate as the web materials are carried on a continuously moving support nor the specific problem of the material being ripped or torn by movement of the moving web against an anvil during bonding.

The U.S. Pat. No. 4,419,160 to Wang et al, issued Dec. 6, 1983, discloses a method and apparatus for dying nonwoven fabric. The Wang et al patent discloses an ultrasonically bondable web of random loose fibers that are held on an endless conveyor screen such as wire, by a vacuum system. The material is discharged from the end of the screen and advanced between overlying horns and underlying anvils of an ultrasonic welding machine. A vacuum is not applied at the point of ultrasonic bonding and the anvil includes various projections which could rip or tear an elastic web material.

The U.S. Pat. No. 3,575,752 to Carpenter, issued Apr. 20, 1971, discloses a metallic screen placed over an anvil surface upon which a nonwoven fabric is bonded. A drive drum propels an endless belt which is in the form of a metallic screen. A nonwoven fabric is supported on the belt to a bonding station under a reciprocating ultrasonic horn. A rigid anvil is disposed directly under the horn and under the belt. The screen belt functions in conjunction with the anvil as a mesh pattern anvil surface upon which the horn works against the intervening workpiece. There is no vacuum applied under the wire mesh. Accordingly, a laminate traveling over the anvil would not be held against the wire screen. There would be a potential for tearing and ripping of the web, as well as loss of contact between the horn and wire screen. There is further no disclosure of a specific structure of a wire screen which can act solely as an anvil in cooperation with the horn to perfect an ultrasonic bonding operation.

The U.S. Pat. No. 3,640,786 to Carpenter, issued Feb. 8, 1972, discloses a method of making pile fabrics wherein thermoplastic pole yarn is fusion bonded to a thermoplastic backing by means of sonic energy. The Carpenter '786 patent discloses a backing member supported in advance by a feed mechanism including an endless belt preferably in the form of a screen that is entrained about a drive drum disposed below an ultrasonic horn. The belt, in combination with the drive drum which backs up the belt serves to advance the backing member to the bonding line and also serves as an anvil member against which the work is compressed by the horn during bonding. No vacuum mechanism is disclosed for retaining two laminate layers on the moving belt, nor is there any direction to the problem of elastomeric fibrous web materials being carried over projections of a anvil.

Plastic web is very difficult to control as the web stretches before it moves. Prior art methods discussed above which do not include a vacuum mechanism cannot maintain the laminated webs at a constant tension during a bonding process. No prior art patents relate to a continuously moving web and a stationary horn for effectively perfecting an ultrasonic bond. Further, the prior art patents do not address the problem of providing a moving forming screen having a construction whereby the screen solely provides an anvil for the ultrasonic bonding process.

The present invention addresses the above discussed problems by providing a vacuum drawn forming screen for movably supporting and carrying an elastic fibrous web while a member is being ultrasonically bonded thereto.

SUMMARY OF THE INVENTION

The present invention provides an ultrasonic bonding apparatus for ultrasonically bonding at least two elastomeric webs together, and generally comprises a stationary ultrasonic bonding device, an anvil transport device for transporting the elastomeric webs to the ultrasonic bonding device for selectively contacting predetermined portions of the elastomeric webs with the bonding device, and a mechanism for delivering the elastomeric webs at a constant tension to the anvil transport device so that the elastomeric webs are bonded together without causing rippling or tearing thereof.

The present invention further provides the method for ultrasonically bonding at least two elastomeric webs together and comprises the steps of providing a bonding station with a stationary ultrasonic bonding apparatus, delivering to the bonding station at least two elastomeric webs, maintaining the delivered elastomeric webs at a constant tension through the bonding station, and selectively contacting predetermined portions of the elastomeric webs with the stationary ultrasonic bonding apparatus so that the elastomeric webs are bonded together without causing rippling or tearing thereof.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF DRAWINGS

Figure 1:
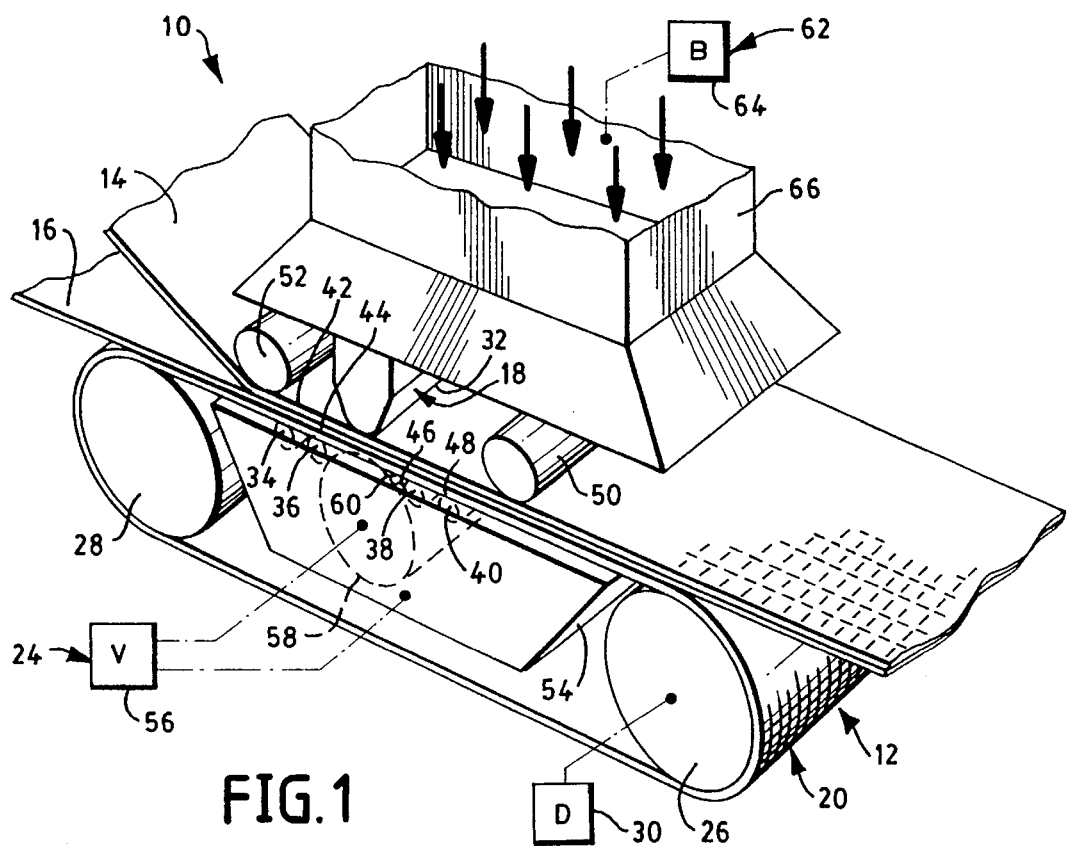
FIG. 1 is a perspective view of the present invention.

An apparatus of the type for laminating two elastomeric fibrous web materials together by ultrasonic bonding constructed in accordance with the present invention is generally shown at 10 in FIG. 1. Like structure between the several embodiments will be indicated by primed numbers.

Generally, the apparatus 10 includes web transport means generally indicated at 12 for transporting at least two overlaid webs 14,16 through the apparatus 10. Ultrasonic horn means generally indicated at 18 transmits ultrasonic energy to bond the webs 14,16 together. Anvil means underlies the ultrasonic horn means 18. The anvil means consists essentially of a wire mesh generally indicated at 20 including high knuckles 22 defining upwardly projecting curved projects 22 for underlying the webs 14,16. Vacuum means generally indicated at 24 draws the webs 14,16 against the wire mesh 20 for perfecting bonding and to prevent rippling and tearing of the webs 14,16 against the anvil means during ultrasonic bonding.

More specifically, the web transport means 12 includes a pair of driven drums 26,28. The drums are operatively connected to a drive mechanism schematically shown at 30 which drives at least one of the drums for rotational movement. The web transport means 12 further includes a continuous belt 20 of the wire mesh mounted about the drums 26,28 for continuous movement as driven by the drive mechanism 30.

The wire mesh 20 consists essentially of a high knuckle weave of wire material. Various weaves can be constructed to form the wire mesh, but the weave must have a high knuckle form defining the projections 22. The projections 22 define curved upper surfaces upon which the web materials 14,16 are held. Wire which is round in cross sectional view provides a smooth woven surface of the wire mesh 20 having smooth yet pronounced upwardly projecting knuckles 22.

The wire mesh 20 consists essentially of metal wires selected from group including bronze and stainless steel. Theoretically, other metals can be used which can perfect the bonding process. The metal must be chosen to have sufficient strength to support the web materials 14,16 through the apparatus 10. The metal must further be strong enough so as not to be deformed by the pinching of the horn member 18. Further, the metal must be selected so as to resonate appropriately for the perfection of the ultrasonic bonding process.

The ultrasonic horn means 18 includes a nonreciprocating horn member 18 having a smooth face 32 directly adjacent the wire mesh 20. The horn 18 is stationary and continuously operational. The face 32 of the horn member 18 defines a bonding area of the wire mesh 20 directly below the face 32. Fixed support bars 34,36,38,40 having smooth upper surfaces 42,44,46,48 provide support means for the wire mesh directly adjacent to the bonding area. The support bars 34,36,38,40 support the wire mesh 20 on each side of the bonding area against downward force applied to the moving wire mesh belt 20. The support bars 34,36,38,40 extend under and across the wire mesh belt 20 adjacent each side of the bonding area. An example of a commercially available horn is manufactured by Branson Ultrasonics Co., Danbury, Conn.

The face 32 of the horn member 18 is mounted adjacent the wire mesh 20 at the bonding area for pinching the webs 14,16 against the wire mesh belt 20 between the support bars 36,38 at the bonding area. Welding is perfected as a knuckle projection 22 of the mesh 20 moves into the bonding area and sonic transmission is perfected between the horn 18 and the raised knuckle projection 22.

The assembly can include further pinching rollers 50,52 to assist in feeding the web material 14,16 to the bonding area. The metal wires forming the wire mesh 20 must be strong enough so as to not be deformed by the pinching rollers 50,52.

The vacuum means 24 includes a vacuum manifold 54 disposed below the area of the wire mesh belt 20 that supports the webs 14,16. This portion of the wire mesh belt 20 defines a web support area for supporting the webs 14,16 thereon. The vacuum manifold 54 is disposed directly below this web support area for perfecting a vacuum suction under and through the wire mesh 20. The vacuum is applied under the entire web support area, including the bonding area. Unlike prior art assemblies including a solid anvil under the bonding area, the present invention provides vacuum suction directly below the bonding area, through the wire mesh 20. This hold-down means prevents puckering and tearing of the web at the bonding area.

The manifold 54 is operatively connected to a vacuum source 56 for applying a vacuum through the manifold 54 to draw the web 14,16 against the wire mesh 20. The wire mesh 20 allows for the vacuum hold down which provides two positive acts. First, the vacuum allows the wire mesh to carry the webs 14,16 without allowing stretching of the webs 14,16. Alternatively, a web can be applied under tension to the wire mesh and retained at that constant tension throughout the laminating process. One of the webs 14,16 can be applied under a first tension and the second of the webs 14,16 can be applied at a second tension or at no tension at all and then bonded together. Secondly, the vacuum allows the wire mesh 20 to carry the web in the thinnest or least bulk thickness possible so that the webs 14,16 can be bonded without wrinkles caused by damming behind the pinching ultrasonic horn 18. Under either circumstance, there is no loss of tension at the bonding area because the vacuum is maintained throughout the web support area, including the bonding area.

Alternatively, and as shown in phantom in FIG. 1, the vacuum means can include a drum or roll 58 operatively connected to the vacuum source 56. The roll 58 is disposed under and adjacent the wire mesh belt 20 and below the ultrasonic bonding horn 18. The roll 58 includes perforations 60 extending therethrough. The vacuum source 56 is operatively connected to the interior of the roll 58 for perfecting a vacuum through the perforations 60 and the adjacent wire mesh belt 20. To increase the drawing effect of the vacuum from the drum 58 on the webs 14,16, the apparatus may be configured so that the wire mesh belt 20 wraps around a portion of the roll 58. In this configuration pinching rollers 50,52 would be brought adjacent to the roll 58 to increase the degree of wrap around the roll 58. The vacum hold-down is maintained through the bonding area.

The apparatus 10 can include blower means generally indicated at 62. The blower means can comprise a source of forced air or other fluid 64 operatively connected to an upper manifold 66 disposed over the web support area of the wire mesh belt 20. The manifold 66 directs the fluid flow downwardly on the web support area to cooperate with the vacuum means 24 to hold the webs 14,16 against the wire mesh belt 20.

In operation, webs 14,16 are fed to the web support area of the wire mesh belt 20 from supply rolls, not shown in the drawings. The combination of the vacuum means 24, and pinching roll 52 holds the overlaid web materials 14,16 on the wire mesh belt 20. The web material 14,16 are pinched underneath the smooth surface 32 of the ultrasonic horn 18 and against the wire mesh belt 20 at the bonding area during the bonding operation. The combination of the smooth face 32 with the smooth yet raised high knuckles 22 of the wire mesh belt 20 provide an area of ultrasonic bonding which does not cause wrinkles, damming, or stretching of the material during the bonding operation. The laminated product is cooled and re-rolled onto a roll, not shown in the drawings.

Figure 4:
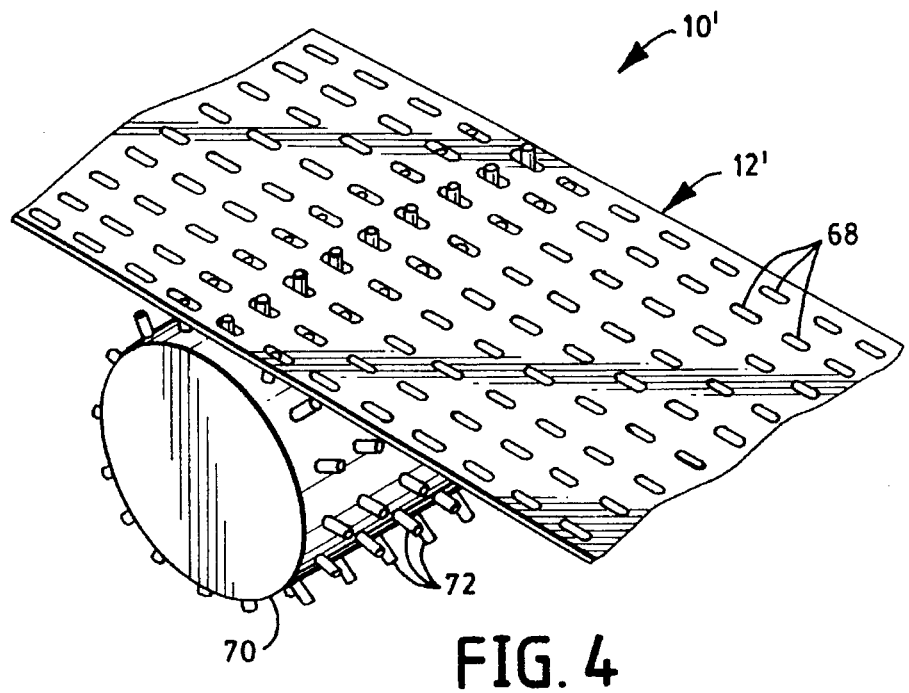
FIG. 4 is a perspective view of a second embodiment of the present invention.
Figure 5:
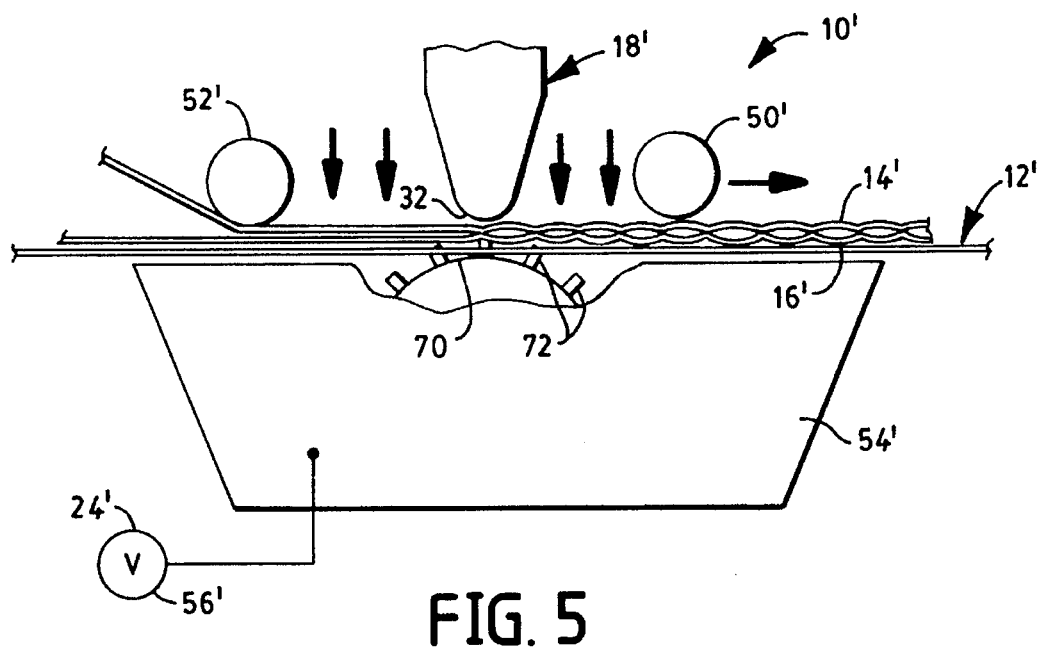
FIG. 5 is a side elevational view of the second embodiment of the present invention.

A second embodiment of the invention is shown in FIGS. 4 and 5. Primed numerals indicate like structure between the embodiments. The assembly 10' includes web transport support means 12' comprising a moveable endless belt 12' having openings 68 extending therethrough. The vacuum means 24' effects a vacuum through the manifold 54' drawing webs against the belt 12' as the vacuum is perfected through the openings 68. The anvil means is a rotatably mounted drum 70 having projections 72 extending radially outwardly therefrom. The projections 72 extend through the endless belt 12' so that the drum 70 rotates as the belt 12' moves. The welding operation is perfected by those of the projections 72 extending through the openings 68 in the belt 12'. As shown in FIG. 5, the projections 72 which extend through the belt 12' are directly below the anvil ultrasonic horn means 18' at the welding station.

In operation, the drum 70 rotates at a speed synchronous with the speed of the moving belt 12'. The welding operation occurs at a row of projections 72 extend below the ultrasonic horn 18' thereby creating a welding pattern as shown in FIG. 6.

Figure 6:
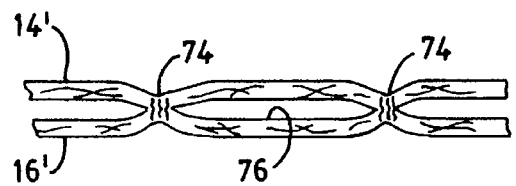
FIG. 6 is a fragmentary side view of a laminate made in accordance with the present invention.

As shown in FIG. 6, the laminate of materials 14' and 16' creates welded portions 74 separated by unwelded portions forming pockets 76.

Figure 7:
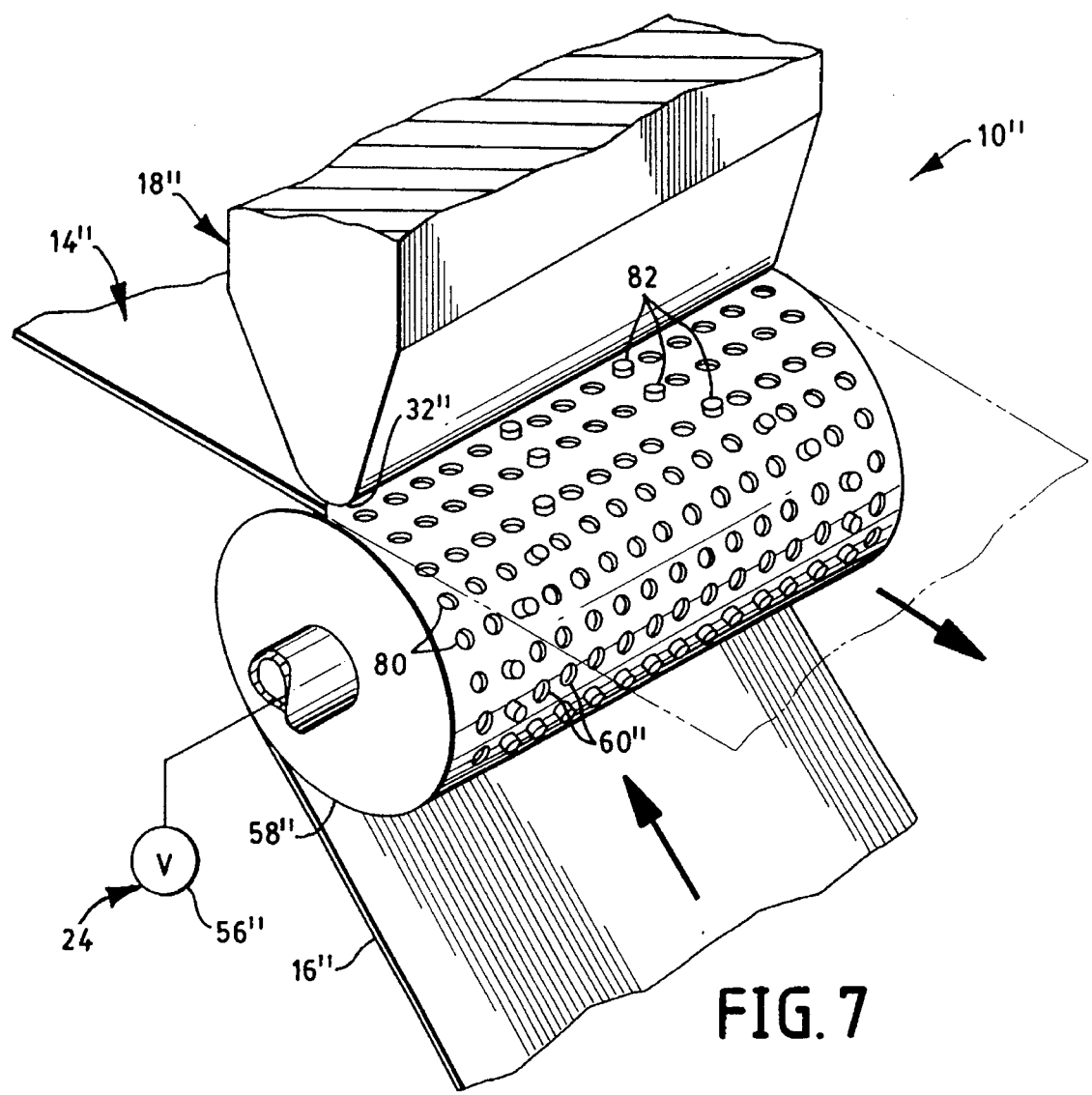
FIG. 7 is a perspective view of a third embodiment of the present invention.
Figure 8:
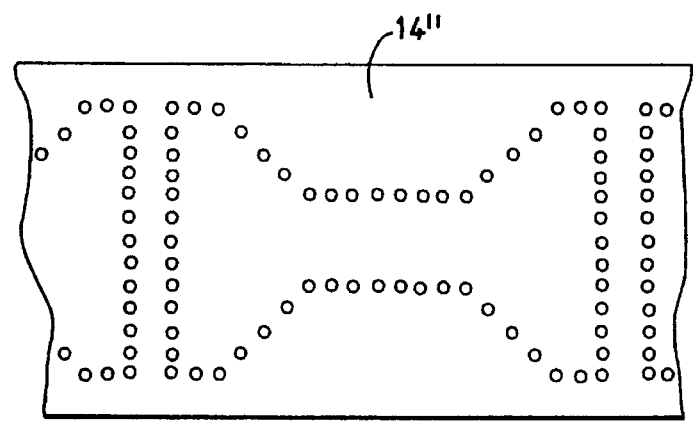
FIG. 8 is a top fragmentary plan view of a laminate made in accordance with the present invention.

A third embodiment of the present invention is shown in FIGS. 7 and 8 wherein double primed numbers indicate like structure between the several embodiments. In this embodiment, the web transport means 12" includes a roll 58" having an outer surface 78 for supporting the pair of overlaid webs 14",16" thereon The first web 14" is fed from a source, such as a roll of web material, not shown in the Figures. The second web 16" is provided from a second source, not shown, below the roll 58". The two webs 14",16" meet at the bonding area as the first web 14" overlays the second web 16".

Figure 2:
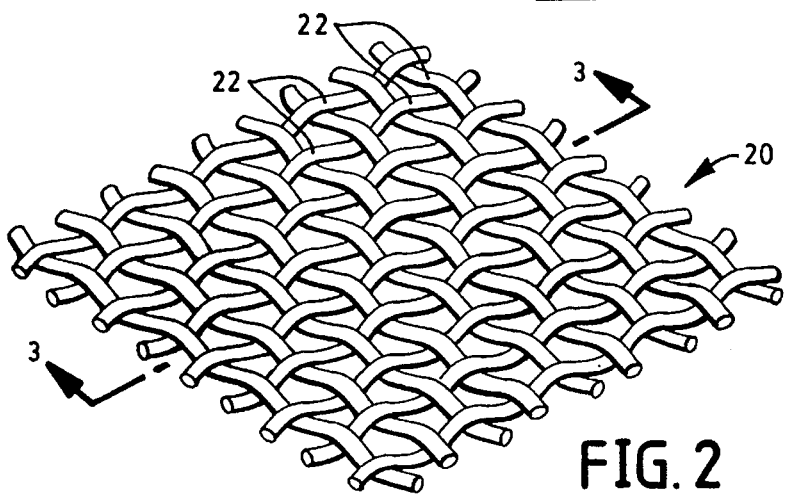
FIG. 2 is a perspective view of the wire mesh constructed in accordance with the present invention.
Figure 3:
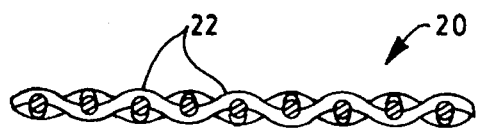
FIG. 3 is a cross sectional view taken substantially along lines 3—3 of FIG. 2.

The outer surface 78 of the roll 58" includes a plurality of openings 80 extending therethrough and operatively connected to the vacuum 24" for perfecting the vacuum through the openings 80 to draw the webs 14",16" against the outer surface 78. The anvil means includes a plurality of projections 82 extending radially outwardly from the outer surface 78. The projections 82 can be pins extending through selected ones of the openings 80 to define a preferred pattern for ultrasonically bonding the webs 14",16" along a specific pattern. The roll 58" provides a highly porous anvil surface, similar to the high knuckle wire mesh 20 as shown in FIGS. 1–3. The raised projections or pin surface 82 provides a pattern of bonding points slightly higher than the outer surface 78 of the roll 58". As in the other previously described embodiments, the ultrasonic horn means 18" is a stationary horn which perfects the bonding operation as the rotating roll 58" brings the projections 82 in proximity to the ultrasonic horn means 18" at the bonding area.

The present invention further provides a method for laminating the two elastic fibrous web materials 14,16 together by ultrasonic bonding. Generally, the method includes the steps of transporting the two overlaid webs 14,16 on the wire mesh 20 having the high knuckles 22 defining curved projections. The webs 14,16 are drawn against the wire mesh 20 to prevent rippling and tearing of the webs 14,16 against the wire mesh 20 during bonding. Finally, ultrasonic energy from the ultrasonic horn 18 is transmitted through the webs 14,16 and to the projections 22 to ultrasonically bond the webs 18 together into a unitary laminate.

More specifically, the webs 14,16 are transported on the continuous wire mesh belt 20, the wire mesh belt 20 continuously moving to support the webs 14,16 between the horn 18 and wire mesh belt 20. Bonding is accomplished as the webs 14,16 are pinched between the stationary ultrasonic horn 18 and the wire mesh 20 at the bonding area of the device.

A laminate is produced pursuant to the instant invention having a pattern left in the laminated webs. The laminated webs appear to have a perforated appearance, as schematically shown in FIG. 1, the appearance being similar to that of a woven bandage. The laminated web does not include any burnt surface, such as that encountered with thermal bonding. Efficiency is increased as there is significantly less rippling and tearing of the moving web, as generally found with the use of anvils including projections extending therefrom.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An ultrasonic bonding apparatus for ultrasonically bonding at least two continuously moving webs together, said apparatus comprising:

an ultrasonic horn means for transmitting ultrasonic energy, said horn means having a face;

a continuously moving anvil means underlying said horn means for perfecting bonding between said two continuously moving webs, said anvil means comprising a continuously moving, air-permeable, endless wire mesh defining a plurality of pronounced upwardly-projecting knuckles; a bonding area of said wire mesh directly below said face of said horn means; and means for providing vacuum suction directly below said bonding area, whereby puckering and tearing of said two continuously moving webs at the bonding area are prevented.

2. The apparatus of claim 1 further comprising a blower means for directing a fluid flow onto said two continuously moving webs to cooperate with the means for providing vacuum suction to hold said two webs against said wire mesh.

3. An ultrasonic bonding apparatus for ultrasonically bonding at least two continuously moving webs together, said apparatus comprising:

an ultrasonic horn means for transmitting ultrasonic energy, said horn means having a face;

a continuously moving anvil means for perfecting bonding between said two continuously moving webs, said anvil means comprising a continuously moving, rotatable drum having a plurality of projections extending radially outwardly therefrom;

a bonding area directly below said face of said horn means; and means for providing vacuum suction directly below said bonding area, whereby puckering and tearing of said two continuously moving webs at the bonding area are prevented.

4. The apparatus of claim 3 wherein said anvil means comprises a plurality of openings through which a vacuum can be drawn.

5. The apparatus of claim 4 further comprising a continuously moving, air-permeable, endless belt for transporting said webs to said anvil means, said belt having therein a plurality of openings such that said projections of said anvil means project through said openings of said belt.

* * * * *